United States Patent Office 3,054,786
Patented Sept. 18, 1962

3,054,786
CHEMICAL COMPOSITION AND PROCESS FOR POLYMERIZING HALOGEN-CONTAINING MONOMERS
Ward J. Burkholder, Houston, and Earnest R. Henderson, Pasadena, Tex., assignors to Diamond Alkali Company, Cleveland, Ohio, a corporation of Delaware
No Drawing. Filed Jan. 9, 1957, Ser. No. 633,182
8 Claims. (Cl. 260—92.8)

This invention relates to new and improved polymers characterized by a high degree of lubricity and stability to heat and light, and to methods of preparing such polymers. More particularly, this invention relates to new and improved vinyl polymers and processes for the manufacture of vinyl polymers characterized by improved lubricity, heat stability, light stability, and improved impact strength when fabricated into articles of manufacture.

Up to the present time, considerable activity has been undertaken in the field of polymer stabilization, especially in the stabilization of vinyl polymers, and numerous additives have been suggested and tried as polymer additives in an effort to improve the heat stability of polymers as well as light stability, lubricity and other characteristics often deleteriously affected during processing of the polymers at elevated temperatures. With the continued and expanding interest in thermoplastic polymers, notably vinyl polymers and especially polymers and copolymers of vinyl chloride or vinyl chloride-containing materials in applications wherein exposure to elevated temperatures is involved, a number of these prior stabilizers have been proposed for incorporation with the polymers in resin formulations.

However, the prior art approach, involving the physical addition of a stabilizer to a polymer generally has failed to provide a substantially completely homogeneous stabilized material prior to actual fusion of the polymer particles at the high temperatures encountered during processing so that there generally has been no stabilizer in the polymer particles for a brief period of time at least, whereby the polymer particles tend to degrade and discolor under the influence of processing heat; thus, for many applications substantially impairing the polymer quality.

Accordingly, the principal object of the present invention is to avoid the difficulties heretofore encountered and to provide a polymer inherently having a high degree of lubricity as well as improved heat stability and light stability.

A further object of the invention is the provision of a new and improved method of polymerization which imparts to the finished polymer a high degree of lubricity, heat stability, and light stability.

A still further object of the invention is the provision of a new and improved vinyl polymer having improved lubricity, heat stability and light stability which, in many instances, requires little or no added stabilizer during conventional heating operations employed in forming plastic mixtures or articles therefrom.

These and other objects and advantages of the present invention will more fully appear from the following description thereof.

Generally, the present invention contemplates preparing halogen-containing polymers characterized by improved lubricity, heat stability, and light stability by subjecting to polymerizing conditions while suspended in an aqueous medium an intimate mixture of the following ingredients:
A. A polymerizable monomer
B. A suspending agent
C. A minor amount of at least one substance selected from the group consisting of (1) metallic salt of carboxylic acids containing at least 3 carbon atoms
(2) ester of a carboxylic acid and polyhydroxy compounds (especially the latter type compound containing 3 or more hydroxy groups)
and recovering the thus-formed polymer therefrom.

It will be appreciated thus that the present invention resides in the improvement in a polymerization process, especially the suspension polymerization of vinyl monomers, which comprises incorporating, during the polymerization process, after the desired suspension is effected but prior to discontinuation of polymerization, (1) a metallic salt of a carboxylic acid containing at least 3 carbon atoms, and/or (2) an ester of a carboxylic acid and a polyhydroxy compound, or a mixture of one or more metallic salts of carboxylic acids with one or more esters of carboxylic acids and polyhydroxy compounds.

It will be understood that the desired metallic salt of a carboxylic acid can be added as such or formed in situ, if desired, via initial introduction of a carboxylic acid and subsequent addition of a salt co-reactable therewith to introduce the desired cation, the latter expedient offering certain advantages in insuring uniform distribution of the desired metallic salt of the carboxylic acid. Polymers produced in this manner have been found inherently to be characterized by an improved lubricity, heat stability and light stability, as well as having a satisfactory polymer particles size distribution.

More specifically, the practice of this invention comprises preparing a halogen-containing polymer characterized by improved lubricity, heat stability and light stability which comprises subjecting to polymerizing conditions a suspension of the following materials:

| | Preferred Type | Preferred |
|---|---|---|
| A. Liquid polymerization medium. | Nonreactive | Water. |
| B. Suspension agent | Polymeric Organic | Gelatin. |
| C. Monomer | Vinyl halide or vinyl halide-containing monomeric mixture. | Vinyl chloride or vinyl chloride-containing monomer mixture. |
| D. At least one of the group of | | |
| (1) metallic salt of carboxylic acid containing at least 3 carbon atoms. | Alkaline earth or heavy metal salt of fatty acid. | Calcium stearate. |
| (2) ester of carboxylic acid and polyhydroxy compound. | Glyceryl monoester of fatty acid. | Glyceryl Monostearate or Glyceryl monoricinoleate. |
| E. Polymerization catalyst. | Peroxide compound | Lauroyl peroxide. |
| F. Buffer | Volatile non-toxic compound. | $NH_4HCO_3$. |

The process of preparing a polymer by subjecting to suspension polymerization conditions the above mixture in accordance with this invention contemplates that the desired suspension, which directly influences the desired particle size of the resultant polymer, be established initially at a pH of 7.0 or less, via addition of an acidic material, e. g., acetic acid, if necessary, before any ester of a carboxylic acid and a polyhydroxy compound is introduced.

A preferred practice of this invention contemplates that the desired suspension is first established at a pH of 7.0 or less, prior to incorporation of any additives which tend undesirably to coarsen the particle size. In this connection it is important that during this period, neither an ester of a carboxylic acid and polyhydroxy compound, nor a metallic salt of a carboxylic acid having more than three carbon atoms, be introduced. Moreover, if a carboxylic acid per se, e.g., stearic acid be added, it is important that it contain substantially no ester of a carboxylic acid and a polyhydroxy compound, e.g., a glyceryl ester.

The time interval required to establish the initial suspension depends, of course, on a number of variables including equipment used, temperature, monomers, additives, objects sought and the like. It has been found in dealing with vinyl polymers generally, and with vinyl chloride specifically, that with continuous agitation following addition of the suspending agent, notably gelatin, the polymerizable monomer, catalyst, and, if desired, a carboxylic acid, preferably one soluble in the monomer and co-reactable with a later-added water-soluble salt to form a desired metallic salt of a carboxylic acid, a time of about 1 hour is the minimum generally required. In many instances, from about 1 to 2 hours is a suitable time interval with 1½ hours presently being the preferred time interval after the catalyst is charged. As to the maximum time interval after polymerization is begun, yet before a metallic salt of a carboxylic acid per se and/or an ester of a carboxylic acid and a polyhydroxy compound is introduced, the addition should preferably be accomplished before all of the monomer has become absorbed by the polymer or, if a constant temperature is maintained, a pressure drop occurs, e.g., the normal decrease in pressure which occurs if temperature is held constant.

As used throughout the specification and claims, the expression "metallic salts of carboxylic acids" is intended to refer to various compounds (whether added as such or formed in situ), among them those compounds frequently termed "soaps," comprising reaction products of carboxylic acids containing at least 3 carbon atoms with various metals such as aluminum, the alkali metals, i.e., sodium, potassium, lithium, cesium, and rubidium, the alkaline earth metals, i.e., the metals of the second group of the periodic table, e.g., calcium, barium, magnesium and strontium, which are preferred at present, as well as, in certain applications, other somewhat more toxic metals such as the so-called "heavy metals," that is, zinc, cadmium, tin, lead and the like.

The carboxylic acids employed in forming the metallic salts of carboxylic acids in accordance with this invention are those carboxylic acids containing at least 3 carbon atoms, many of which are termed "fatty acids," selected from the saturated monocarboxylic acids of the general formula ($C_nH_{2n+1}COOH$), wherein $n$ is at least 2, e.g., butyric acid, caproic acid, caprylic acid, capric acid, lauric acid, myristic acid, palmitic acid, stearic acid, arachidic acid, behenic acid and lignoceric acid. Other acids which may be employed, in certain instances, include saturated diacids ($C_nH_{2n}(COOH)_2$) such as oxalic acid, malonic acid, succinic acid, glutaric acid, adipic acid, and the like, as well as the unsaturated monocarboxylic acids of the formula $C_nH_{2n-x}COOH$ (where $x$ is from 1 to 5) such as myristoleic acid, palmitoleic acid, oleic acid, linoleic acid, elaeostearic acid, and erucic acid.

Another type of acid contemplated comprises the so-called "hydroxy acids" having the general formula $$C_nH_{2n+2-(y+m)}(OH)_y(COOH)_m$$

wherein $y$ is at least one, $n$ is dictated by chain lengths desired, and $m$ is a number from 1 to 3, inclusive. Illustrative compounds of this type are hydroxystearic acid, lactic acid, and citric acid. Specific illustrative metallic salts of carboxylic acids in accordance with this invention are calcium stearate, calcium laurate, and calcium ricinoleate. Among these, the alkaline earth salts of fatty acids, notably calcium salts, are especially desirable where nontoxicity is a factor to be considered when the product is to be fabricated into items which will contact food for humans, e.g., potable water containers, piping for food canning plants, food wrapping materials, and the like.

The expression "ester of carboxylic acid and polyhydroxy compound" as used throughout the specification and claims is intended to refer to a compound formed by chemically combining a polyhydroxy compound, especially a carbinol or polyol having three or more hydroxy groups, such as glycerol, which is preferred at present, and a carboxylic acid. Hence, a preferred type of ester comprises glyceryl esters of carboxylic acids. The carboxylic acids employed in forming the esters generally may be any of the carboxylic acids previously mentioned.

In most instances, a preferred glyceryl ester comprises a glyceryl monoester, i.e., an ester wherein only one hydroxy radical is replaced by an ester-forming radical of a carboxylic acid and may or may not be the same acid as that used in forming the metallic salt of a carboxylic acid.

Of the monoglycerides, it is believed that the alpha monoglycerides are especially desirable.

Specific illustrative esters of carboxylic acids and polyhydroxy carbinols are glyceryl ricinoleate, glyceryl laurate, glyceryl stearate, glyceryl palmitate, and more specifically, glyceryl monoricinoleate, glyceryl monolaurate, glyceryl monostearate, and glyceryl monopalmitate.

The proportions of a metallic salt and/or ester of a carboxylic acid and polyhydroxy compound desirably employed depend somewhat on the specific polymerizable mixture involved, the equipment available, and the like. However, it generally is desirable to employ a total amount of the metallic salt of carboxylic acid (or carboxylic acid and co-reactable metal salt), ester of a carboxylic acid and a polyhydroxy carbinol, or any mixture of these materials, within the range from about 0.05 to 4.0 parts per 100 parts of the formed polymer.

In terms of the polymerization mixture, the metallic salt of a carboxylic acid containing at least 3 carbon atoms, if used, generally, should comprise up to about 1.0% by weight of monomer, a typically practicable range being about 0.05 to 0.5% by weight of monomer. Similarly, the ester of a carboxylic acid and polyhydroxy compound, if used, desirably should not exceed about 2.0% by weight of the monomer and preferably should comprise about 0.05 to 1.50%, especially 0.50 to 1.50%, typically 1.00%, by weight of monomer.

When a mixture of a metallic salt of a carboxylic acid and an ester of a carboxylic acid and a polyhydroxy carbinol is employed, the ester generally constitutes the major proportion of this mixture with the metallic salt of the carboxylic acid constituting a minor proportion, i.e., less than 50% by weight. A specific illustrative formulation based upon a quantity of one ton of polyvinyl chloride, produced via suspension polymerization using gelatin as a suspending agent, involves the addition during polymerization of 2.34 lbs. calcium acetate, 6.4 lbs. stearic acid, 27.5 lbs. of glyceryl monostearate, and 3.3 lbs. of ammonium bicarbonate.

It will be appreciated that the metallic salt of the carboxylic acid may be either added as such or formed in situ by incorporation of suitable carboxylic acid and a suitable metallic salt co-reactable therewith to form the desired metallic salt of a carboxylic acid in situ, e.g., stearic acid and calcium acetate can be added to provide calcium stearate in situ.

More specifically, the method of this invention involves introducing into an enclosed reactor, typically jacketed and provided with an agitator, water and the monomer to be polymerized together with suitable catalyst, suspending agent, and buffer, at least one substance from the group consisting of (1) the desired metallic salt of a carboxylic acid, (2) the desired ester of a carboxylic acid and a polyhydroxy carbinol or (3) a mixture of these materials and effecting polymerization of a suspension of this mixture with the aid of heat and the catalyst until a desired conversion is achieved.

Another embodiment of the practice of this invention involves combining, in an enclosed reactor, water, a fatty acid, the monomer or monomer mixture to be polymerized, notably vinyl chloride, a suspending agent, a polymerization catalyst, a metallic salt containing the desired cation and co-reactable with the fatty acid to form the desired metallic salt of a carboxylic acid, e.g., calcium acetate, a glyceryl monoester, such as glyceryl monoricinoleate, a buffer such as ammonium bicarbonate and effecting polymerization with the aid of heat and the catalyst until the desired conversion is effected.

In order that those skilled in the art may more completely understand the present invention and the preferred methods by which the same may be carried into effect, the following specific examples are offered:

EXAMPLE I

*Part A.*—Into a glass beverage bottle reactor are introduced 100 gms. vinyl chloride monomer, 200 gms. water, 0.25 gm. lauryl peroxide, 0.30 gm. gelatin and 0.50 gm. calcium stearate. In preparing this mixture, the gelatin is dissolved in water and the pH adjusted to 7.9 with ammonium hydroxide. To the bottle is added 200 ml. of this solution into which is then weighed the dry catalyst and stearate. After charging the monomer, the contents of the bottles are brought up to approximately 25° C. and then each bottle is vigorously agitated to dissolve and distribute the catalyst and stearate. Polymerization with continuous agitation is carried out for 18 hours at 50° C. The resultant polymer has a satisfactory particle size and colloidability and is characterized by excellent lubricity, heat stability and light stability.

*Part B.*—Two parts of the polymer of Part A (with no additional stabilizer incorporated) is mixed with one part of dioctyl phthalate as plasticizer and milled for 10 minutes at 320° F. For comparative purposes, a sample of the same type of polymer which has not had any stabilizer introduced during polymerization is milled under identical conditions. The polymer of Part A exhibits excellent lubricity to the extent that the mill marks normally associated with unlubricated formulations are not observed as milling progresses and a significant improvement in heat stability, over the conventional polymer, is observed.

*Part C.*—A part of the milled sample of Part A and the control are molded together at 345° F. for 2 minutes at 1500 p.s.i. Both specimens are clear and the color of the resin containing calcium stearate is noticeably lighter than the control. Four strips cut from this composite molded specimen are then exposed at 350° F. in a circulating air oven for 15 minute intervals. As a result, all exposed samples are varying shades of amber or red but in each instance the prestabilized polymer of Part A is noticeably superior to the control.

EXAMPLE II

Into an enclosed reactor are charged 986 gallons of water and 14 lbs. 11 oz. (0.30% by weight of monomer) gelatin as a dispersing agent. To this mixture, which is continuously agitated, is introduced 11 lbs. 8 oz. of stearic acid (substantially free of glycerides) suspended in 50 gallons of water. When the temperature in the polymerizer reaches 115° F. 630 gallons of vinyl chloride monomer is charged followed by addition of 12 lbs. 5 oz. of lauroyl peroxide in 50 gallons of water. One hour after the catalyst is added, 4 lbs. 3 oz. of predissolved calcium acetate is charged into the reactor and 49.4 lbs. of glyceryl monoricinoleate and 5 lbs. 15 oz. predissolved ammonium bicarbonate, as a buffer, are added. Polymerization is then continued with continuous agitation as a suspension polymerization operation at a temperature of about 140° F. until a pressure drop of about 2 to 5 p.s.i.g. occurs at which time the polymer suspension is discharged from the reactor and recovered by conventional centrifuging or filtration and drying.

It is observed that the polyvinyl chloride produced in this manner has a high degree of lubricity and prestabilization which in many instances avoids the heretofore necessary inclusion of an additional stabilizer prior to heat processing thereof. Moreover, articles fabricated from this resin are characterized by excellent color.

EXAMPLE III

An illustrative formulation of a prestabilized rigid vinyl chloride polymer in accordance with this invention is the following:

Ingredients:
  Prestabilized polyvinyl chloride [1] _____parts__ 100
  Titanium dioxide ($TiO_2$) _____do____ 4
  Thermolite 31 [2] _____do____ 2
  Calcium stearate _____do____ 2
  Banbury discharge temperature ___° F____ 270–280
  Mill temperature _____° F____ 330

[1] A prestabilized, prelubricated polyvinyl chloride containing 0.25 part calcium stearate and 1.00 part glyceryl monoricinoleate, added during suspension polymerization thereof as in Example II.
[2] Commercially available stabilizer—described and claimed in U.S. Patent 2,648,650.

Compared with a conventional polyvinyl chloride formulated in an identical manner, a molded specimen of the above prestabilized resin is notably whiter thus indicating a high degree of thermal stability and excellent color.

EXAMPLE IV

Into an enclosed reactor provided with an agitator are introduced 1010 gallons of soft water and 14 lbs. 11 oz. of gelatin as a suspending agent. To this mixture is added 11 lbs 8 oz. of stearic acid (high purity having an ester number no greater than 1.0). Agitation is continued and heat is applied to the reactor until the temperature of its contents reaches 115° F., at which time 640 gallons of vinyl chloride monomer is charged. With the contents of the reactor maintained at 115° F., 12 lbs. 5 oz. of lauroyl peroxide are introduced rapidly in 50 gallons of soft water.

Agitation is then continued for one hour at which time 4 lbs., 2 oz. of calcium acetate is introduced in about 2 gallons of water to provide for formation of calcium stearate in situ. After 10 minutes with continuing agitation, 49.4 lbs. of glyceryl monostearate (1.0% by weight of the vinyl chloride monomer charged) is introduced. After 10 minutes continuous agitation, 5 lbs., 15 oz. of ammonium bicarbonate is introduced in 2 gallons of water. With the temperature of the contents of the suspension within the reactor maintained at about 130° F., polymerization is carried out with continuous agitation until the desired conversion is reached, at which time the thus-formed polymer is recovered. The polymer obtained in this manner exhibits a high degree of lubricity, heat stability and light stability.

EXAMPLE V

The procedure of Example IV is repeated except that with the addition of stearic acid, 200 ml. of acetic acid, diluted with 800 ml. of water, is introduced into the reactor with 50 gallons of water. To compensate for the added acetic acid, which is added to insure that the initial pH is less than 7.0, subsequently to maintain a higher pH throughout the majority of the polymerization run thereby to prevent solubilization of calcium, the ammonium bicarbonate charge is increased to 7 lbs. The resultant polymer is characterized by a high degree of lubricity and prestabilization which renders its use highly advantageous in many applications and is of finer particle size than the product from Example IV.

EXAMPLE VI

Using the procedure as in Example I, polymerization of vinyl chloride is carried out via addition of 0.25% by weight of monomer of calcium stearate. The resultant resin is found to have sufficient lubrication for milling in a rigid formulation and to have appreciably better heat stability than conventionally-prepared polyvinyl chloride resins. Using this prestabilized polymer, a rigid formulation of polyvinyl chloride is prepared by milling in a 2-roll mill 100 parts polyvinyl chloride resin, 2 parts of a commercially available stabilizer, Thermolite-31, and 2 parts titanium dioxide. The performance on milling of this formulation is superior to conventional unstabilized polyvinyl chloride.

Heat stability is evaluated using 100 parts of a pre-stabilized polyvinyl chloride as above and 50 parts of dioctyl phthalate, with and without added stabilizer which, when used, consists of 2 parts of the commercially available product known as Ferro 1820 plus one part Ferro 903. The unstabilized samples are milled for 15 minutes at 290° F. with samples taken at one-minute intervals and the stabilized samples are milled for 30 minutes and sampled at 5-minute intervals. It is observed that the addition of 0.25% calcium stearate to the polymerization recipe produces a resin which singularly improves heat stability and lubricity.

In carrying out the polymerization in accordance with this invention the process is not restricted to any particular catalyst since the reaction conditions suggested do not interfere with the activity of the catalyst and no well-recognized catalyst is known which defeats the ends of this invention although peroxide type compounds are preferred at present. Accordingly, for example, there may be employed any of the well-known catalysts such as benzyl peroxide, lauryl peroxide, dicapryl peroxide, acetyl benzyl peroxide, diacetyl peroxide, p-tertiary butyl perbenzoate, tertiary butyl perlaurate, ditertiary butyl peroxide, organic azo compounds such as alpha, alpha'-azo diisobutyronitrile, and dimethyl alpha, alpha' azo diisobutyrate. Each catalyst will, of course, have its optimum concentration, that is to say, a concentration sufficient to effect a substantially complete polymerization at a suitable reaction rate. The reaction proceeds without difficulty or disadvantage in the presence of any of the well-known polymerization catalysts, especially peroxide compounds, at concentrations of about 0.10 to 0.40% by weight of the monomer. Catalyst concentrations of about 0.15 to 0.30% by weight, generally being more suitable because of improved reaction rate and an optimum range being from about 0.20 to 0.25% by weight of the monomer.

In most instances it is desirable to employ a buffer or pH regulant to prevent development of acidity in carrying out the polymerization in order to provide a desirable pH throughout the course of the polymerization. In this connection, various buffers may be used with advantage including ammonium bicarbonate, which is preferred, ammonium carbonate or ammonium hydroxide, alkali metal carbonate, alkali metal bicarbonate, phosphoric acid salts with up to two hydrogen ions replaced by ammonium ions or alkali metal ions, e.g., disodium phosphate, and the like. The amount of buffer to be employed may vary but in most instances it should be added in an amount of up to about 0.10% by weight of monomer, a typically practicable amount being 0.02 to 0.10%.

Gelatin is known to be an exceedingly complex proteinaceous substance which is derived from animal substance by various processes. The material is commercially available in three slightly different forms, all of which are useful in the practice of this invention. These forms are a so-called acid hydrolyzed product, a so-called alkali, i.e., lime, hydrolyzed product, and a non-ionized form obtained by hot water hydrolysis of animal substance. These materials, as supplied commercially, vary slightly in their isoelectric pH's, namely, from about 7 to 8.2 for the acid product, about 4.8 to 5 for the alkali product, and about 4.7 for the non-ionized form. While the present invention may be practiced employing any of these three forms of gelatin, the alkali-hydrolyzed material has been found to have excellent usefulness.

Reference herein to gelatin is for convenience and the term as employed denotes the several forms. Such reference is not intended to exclude from the scope of this invention the use of other suspending agents in lieu of gelatin, including various materials such as methyl cellulose, polyvinyl alcohol, gum tragacanth, sodium alginates, and the like. Gelatin may suitably be added to the system in quantity of from about 0.10–0.45 percent by weight of the vinyl chloride monomer and excellent results are obtained in all respects within this range.

The water:monomer ratio in the system is not especially critical and may generally vary from about 1.00 to 4:1. More suitable, however, because of the decrease in volume to be handled is a water:monomer ratio of about 1.90 to 3:1, a preferred water:monomer ratio being about 1.90 to 2.25:1, a specific preferred ratio being 2.22:1.0, these ratios being in terms of volume ratios.

The time for carrying out polymerization in accordance with this invention generally is dictated by the combination of factors including the concentration of monomer, temperature employed, catalyst used, percent conversion desired, typically 70–95%, nature of the reaction equipment and the temperature of the cooling water and the like. However, the reaction time is not inordinately long, generally requiring less than about 15 hours under preferred conditions typically 8 to 10 hours, the time being dictated largely by the temperature control possible. If desired, the reaction can, of course, be speeded up considerably, a typically practicable method of carrying out the reaction involving polymerization in an enclosed vessel provided with means for effecting continuous agitation and for application or withdrawal of heat, if necessary, to maintain a constant temperature.

The reaction temperature utilized depends upon a number of factors also but in general it is found that excellent results are obtained by operating at a temperature of about 120°–150° F., this range being preferred in most instances. However, reaction proceeds advantageously at temperatures from about 105°–160° F. although 115°–140° F. is more suitable since at about 105° F. reaction generally is undesirably slow for most purposes and at temperatures of about 160° F. the molecular weight of the product is, for most applications, too low.

The term "vinyl" as used throughout the specification and claims in referring to both monomers and polymers is intended generally to mean those monomers having the characteristic structure

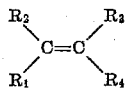

wherein $R_1$, $R_2$, $R_3$ and $R_4$ are selected from the group consisting of hydrogen, halogen and organic radicals, and to the polymers obtained therefrom. More particularly, the term "vinyl" is intended to refer to monomers having the structure

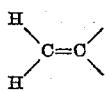

such as vinyl halides and vinylidene halides. While the invention has been described with particular reference to the production of polyvinyl chloride, it may be practiced also in the production of polyvinyl chloride-containing copolymers, especially copolymers in which vinyl chloride generally constitutes at least about 50% by weight, preferably about 85% by weight, of the mixture of monomeric materials.

Thus, the process of the invention is applicable to processes wherein unsaturated monomers or mixtures of several monomers such as vinyl halides, notably vinyl chloride, vinylidene derivatives, especially, halides, vinyl esters of carboxylic acids, for example, vinyl acetate, vinyl propionate, vinyl butyrate, vinyl benzoate, esters of unsaturated acids, e.g., methyl acrylate, ethyl acrylate, butyl acrylate, allyl acrylate and the corresponding esters of methacrylic acids; vinyl aromatic compounds, e.g., styrene, orthochloro styrene, p-chlorostyrene, 2,5-dichlorostyrene, 2,4-dichlorostyrene, p-ethyl styrene, divinyl benzene, vinyl naphthalene, alpha-methyl styrene, dienes such as butadienes, chloroprenes, amides, such as acrylic acid amide, nitrile such as acrylic acid nitrile, esters of alpha-beta unsaturated carboxylic acids, e.g., the methyl, ethyl, propyl, butyl, amyl, hexyl, heptyl, octyl, allyl, methallyl and phenyl esters of maleic, itaconic, fumeric acids and the like. The process of the invention also is to be understood as being applicable to vinyl halides broadly, i.e., vinyl chloride, vinyl bromide, and the like, although vinyl chloride constitutes a preferred vinyl halide. The prestabilized polymers and copolymers of this invention also are advantageously combinable with various elastomeric and/or resinous materials such as neoprene, nitrile rubber, butadiene copolymers, and the like.

It is to be understood that although the invention has been described with specific reference to particular embodiments thereof, it is not to be so limited, since changes and alterations therein may be made which are within the full intended scope of this invention as defined by the appended claims.

What is claimed is:

1. A method of preparing a polymer characterized by improved lubricity, heat stability and light stability which comprises subjecting to suspension polymerization conditions in an aqueous medium, the following ingredients:
    A. A polymerizable halogen-containing ethylenic monomer
    B. A suspending agent selected from the group consisting of gelatin, methyl cellulose, polyvinyl alcohol, gum tragacanth and sodium alginates
    C. A metallic salt of a carboxylic acid
    D. An ester of a carboxylic acid and a polyhydroxy compound and recovering the thus-formed polymer.

2. A method of preparing a polymer characterized by improved lubricity, heat stability and light stability which comprises subjecting to suspension polymerization conditions in an aqueous medium, the following ingredients:
    A. A vinyl halide-containing monomer
    B. A suspending agent selected from the group consisting of gelatin, methyl cellulose, polyvinyl alcohol, gum tragacanth and sodium alginates
    C. A peroxide polymerization catalyst
    D. A metallic salt of a carboxylic acid
    E. An ester selected from the group consisting of glyceryl monoricinoleate, glyceryl laurate, glyceryl stearate, and glyceryl palmitate and recovering the thus-formed polymer.

3. The method as claimed in claim 2 wherein the metallic salt is an alkaline earth metal salt.

4. The method as claimed in claim 2 wherein the ester is glyceryl monoricinoleate.

5. The method as claimed in claim 3 wherein the alkaline earth metal salt is a calcium salt.

6. The method as claimed in claim 3 wherein the calcium salt is selected from the group consisting of calcium stearate, calcium laurate and calcium ricinoleate.

7. The polymer produced in accordance with the method as claimed in claim 1.

8. The polymer produced in accordance with the method as claimed in claim 2.

References Cited in the file of this patent

UNITED STATES PATENTS

| | | |
|---|---|---|
| 2,194,354 | Crawford et al. | Mar. 19, 1940 |
| 2,462,331 | Myers | Feb. 22, 1949 |
| 2,473,929 | Wilson | June 21, 1949 |
| 2,823,200 | Longley et al. | Feb. 11, 1958 |
| 2,824,862 | Longley et al. | Feb. 25, 1958 |
| 2,862,912 | Ott | Dec. 2, 1958 |

FOREIGN PATENTS

| | | |
|---|---|---|
| 130,379 | Australia | Nov. 30, 1948 |
| 154,434 | Australia | Dec. 8, 1953 |
| 698,359 | Great Britain | Oct. 14, 1953 |

OTHER REFERENCES

Schildknecht: Vinyl and Related Polymers, 1952, p. 394, John Wiley & Sons, New York. Copy in Sci. Libr.